United States Patent [19]

Tremblay

[11] 4,194,492

[45] Mar. 25, 1980

[54] SOLAR HEATING APPARATUS

[76] Inventor: Gerald J. Tremblay, 7015 Leighton Way, Orlando, Fla. 32807

[21] Appl. No.: 838,666

[22] Filed: Oct. 3, 1977

[51] Int. Cl.² ............................................. F24J 3/02
[52] U.S. Cl. ................................. 126/425; 126/438
[58] Field of Search ................ 126/270, 271; 60/640; 185/27

[56] References Cited

U.S. PATENT DOCUMENTS

| | | | |
|---|---|---|---|
| 683,088 | 9/1901 | Wideen | 126/270 |
| 3,999,389 | 12/1976 | Bryce | 126/271 |
| 4,038,971 | 8/1977 | Bezborodko | 126/271 |
| 4,056,309 | 11/1977 | Harbison et al. | 126/270 |
| 4,079,249 | 3/1978 | Glynn | 60/641 |
| 4,132,223 | 1/1979 | Reddell | 126/271 |

FOREIGN PATENT DOCUMENTS 824726 11/1937 France ................................. 126/271

Primary Examiner—Carroll B. Dority, Jr.
Attorney, Agent, or Firm—Duckworth, Hobby, Allen & Pettis

[57] ABSTRACT

The solar fluid heater has a frame and a solar collector for collecting and concentrating solar energy movably mounted on the frame. An inclination adjustment system is attached to the frame for rotating the solar collector for different inclinations of the earth relative to the sun, and a solar tracking system moves the solar collector in a different direction on the frame during daylight hours responsive to the flow of liquid from a reservoir mounted thereon to track the sun during daylight hours.

14 Claims, 5 Drawing Figures

SOLAR HEATING APPARATUS

BACKGROUND OF THE INVENTION

The present invention relates to solar energy collectors and especially to solar heaters for following the sun and collecting and concentrating the solar energy for heating a fluid passing through the solar collector.

In the past a great variety of solar heaters has been provided for collecting solar energy for use for heating water, as well as for heating homes, generating electricity, and the like. The most common type of solar collector is the flat plate collector which can be mounted on a home or building and includes a flat container which may be painted black inside and may have a pipe passing therethrough in serpentine fashion, and a transparent covering plate so that water passing through the pipe may be heated. This type of solar heater is the most popular for heating water for a hot water tank or swimming pool inasmuch as it is inexpensive to make and mount on the roof of a building. However, it is also one of the least efficient, since during the daily rotation of the earth, the energy from the sun is received at different angles throughout the day, while the collector is mounted at a fixed angle on the roof, and in addition, the angle of the rays differs on a daily basis as the inclination of the earth tilts relative to the sun.

It has also been suggested in the past to have solar collectors which concentrate the solar rays to produce much higher heat from the sun's rays directed against water pipes and this type of heater may be a parabolic reflector or a plurality of mirrors or various types of lenses for concentrating the rays of the sun to a smaller area for increasing the amount of heat on the smaller area, such as against a water pipe. In a solar collector of this latter type, it has also been suggested to track the sun with mirrors or parabolic reflectors using photocells, so that the parabolic reflector always faces to the sun during daylight hours. This, however, requires photo-cells and electrical circuits, as well as a complex mechanical arrangement for moving large parabolic collectors, and becomes prohibitive in cost for everyday use.

The present invention, on the other hand, relates to a solar collector and concentrator utilizing a reflector to direct the energy at a broad focal area, which has an improved concentrating fluid handling system and provides for following the sun on a daily basis with an inexpensive, adjustable tracking system, and also provides for moving the collector on a weekly basis to compensate for different inclinations of the earth.

SUMMARY OF THE INVENTION

A solar heater is provided having a framework which has a base frame portion, a support frame portion, and a movable support portion, and having a solar collector mounted on the movable portion of the frame for concentrating solar energy directed against the solar collector. An inclination adjustment system is provided for adjusting the movable portion of the frame for different inclinations of the earth relative to the sun, and a scale may be provided in the inclination system to mark the amount of adjustment for the daily inclination adjustments. The inclination adjustment is made between the base frame portion and the movable frame portion. A solar tracking system is provided for moving the solar collector in the frame during daylight hours responsive to the flow of a liquid from one reservoir mounted on the solar fluid heater through a series of reservoirs, whereby a counter-balanced solar collector is gradually moved during the day to follow the sun.

BRIEF DESCRIPTION OF THE DRAWINGS

Other objects, features, and advantages of the present invention will be apparent from the drawings, in which.

DESCRIPTION OF THE PREFERRED EMBODIMENT

Figure 1:
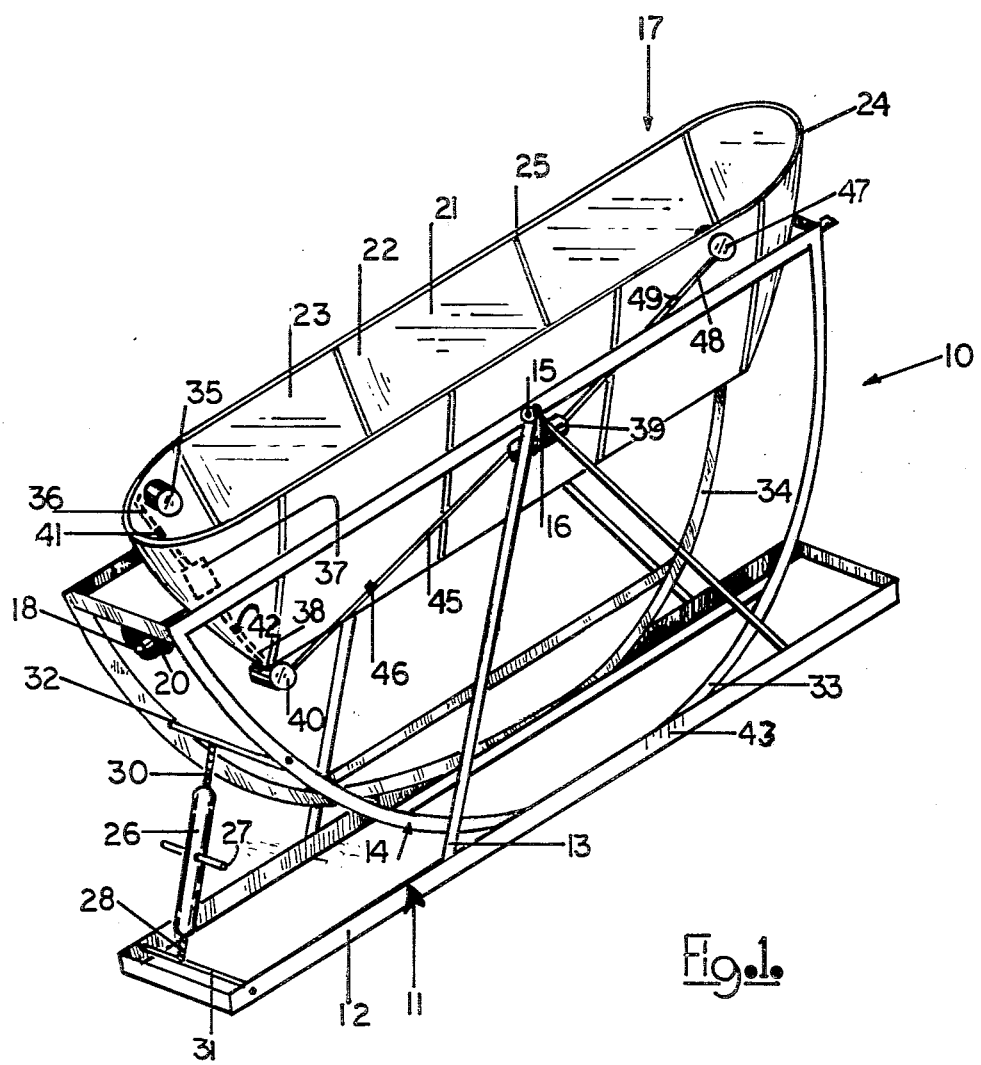
FIG. 1 is a perspective view of a solar heater in accordance with the present invention.

Referring to the drawings, and especially to FIG. 1, a solar heater 10 is shown having a frame 11 with a base portion 12, a supporting portion 13, and a movable portion 14, moving on journals 15, supported in bearings 16. A solar collector 17 is supported by a shaft 18, protruding from each end to the movable portion 14 of the frame 11. The shaft 18 is supported in a journal 20, and attached to the framework to allow the collector 17 to rotate in one direction while the movable frame portion 14 pinned at 15 rotates in a different direction. The collector 17 has a glass cover 21 and a reflecting surface 22 formed on insulated side 23 in an elongated parabolic dish, having curved end portion 24 and reinforcing ribs 25. A turnbuckle pushing and pulling member 26 has a pair of handles 27 and threaded portions 28 and 29 protruding from either end thereof. Rotating turnbuckle 26 with threaded members 28 and 30 extends members 28 and 30 simultaneously and retracts them simultaneously depending upon the direction of rotation of turnbuckle 26. The threaded portion 28 is attached to a frame member 31 connected to the base 12, while the threaded member 30 is attached to a frame member 32 connected to the movable frame portion 14. Thus, rotation of the turnbuckle in one direction moves the movable frame portion 14 on the pin 15 in one direction while rotating the turnbuckle 26 in the opposite direction moves the movable portion 14 in the opposite direction. The movable frame portion 14 has a pair of curved frame members 33 and 34 which ride on the base frame 12 for additional support of the movable frame portion 14. The turnbuckle 26 is used to compensate for changes in the inclination of the earth relative to the sun on a day-to-day or weekly basis, so that the collector 17 will remain aimed towards the sun as the seasons changes during the year.

The collector 17 is pinned by the shaft 18 to the movable frame portion 14 and is weighted to be balanced for ease in rotation so that it can be gradually rotated on the shaft 18 to a second position at a speed to approximate the rotation of the earth, so as to follow the sun during the day. This is accomplished by an upper reservoir 35 which may be filled with a liquid such as water, antifreeze, or the like, and which is connected through a pipeline 36 to an intermediate reservoir 37, which in turn is connected by a pipeline 38 to a bottom reservoir 40. The line 36 has a petcock valve in it 41, while the line 38 has a petcock valve 42 therein for adjusting the flow through the lines. A fluid container 39 is connected to the container 40 by a fluid line 45 having a petcock 46 and container 40 is connected to a container 47 by a fluid line 48 having a petcock 49 therein. The unit is made so that during the early morning the collector 17 is turned in a counter-clockwise direction, and the reservoir 35 is filled with a fluid which is allowed to slowly pass through the pipe 36 to the intermittent reservoir 37, and when the collector rotates a sufficient distance the fluid will begin to flow to the reservoir 40 and upon further rotation fluid will begin to flow to container 39 and then to container 47. The rate of flow can be adjusted by the petcocks 41 and 42, and as the fluid flows between the reservoirs, the balance of the collector on the pins 18 is changed, thereby gradually shifting the collector from its most counter-clockwise position in a clockwise direction, following the direction of the sun during the day. The position of the outlet line from each container prevents the flow from the container until the collector has reached a predetermined point. A series of graduated indicia marks 43, located on the base 12 of the frame 11 allows the positioning of the turnbuckle to the proper position for each day, or for each weekly adjustment.

Figure 2:
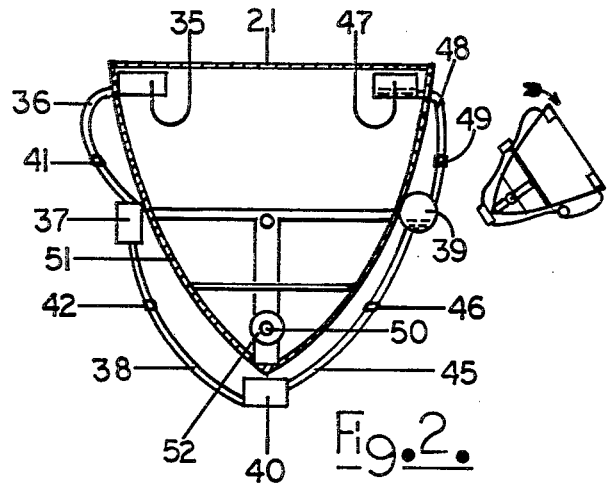
FIG. 2 is a sectional view of the solar collector in accordance with FIG. 1, illustrating the solar tracking system for tilting the solar collector during the day.
Figure 3:
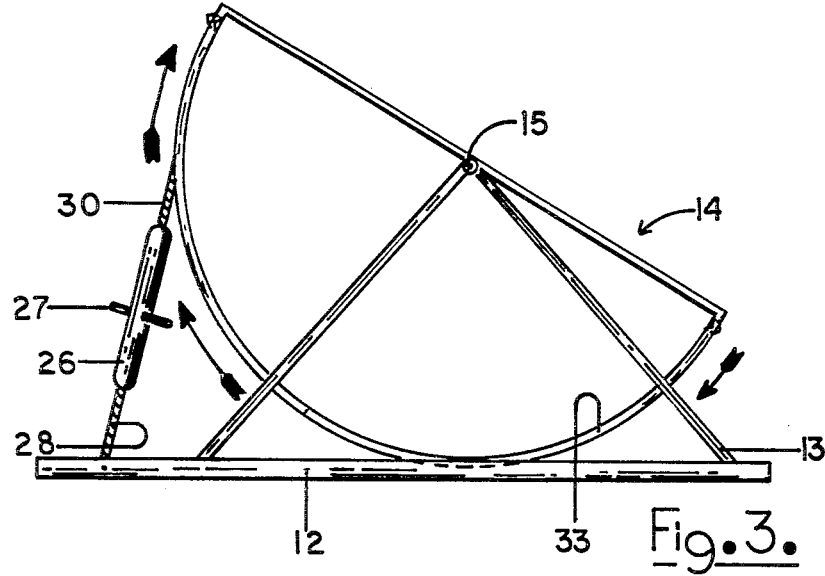
FIG. 3 is a side sectional view of the framework of the solar heater of FIG. 1, illustrating the inclination adjustment system of the solar heater.

Turning to FIGS. 2 and 3, the operation of the present invention in maintaining the collector in a perpendicular direction to the sun's rays is more clearly illustrated. The earth's inclination on a daily basis causes a change in the altitude of the sun relative to the earth of about 15.5 seconds of arc per day and adjustments in the initial setting and daily adjustments must be made to the present system. To make the initial adjustments, the center line of the collector or trough 17 through the axis of the shaft 15 is meridianly aligned north and south when the collector, by means of the support cradle 14 is tilted by the turnbuckle 26 such that the angle formed by a horizontal line and the tilt would be equivalent to the latitude of the location of the apparatus. If this latitude is not known, the tilted line would point to Polaris, or North Star. Deviations from this tilt can then be known by the indicia marks 43 reaching predetermined points on the rocker frame members 33 and 34, so that on March 21, when the vernal equinox is reached, the collector with rocker frame members 33 would be centered on the frame base 12 and would be graduated in each direction thereafter to the points on the ecliptic midway between the equinoxes, or the soltices, at an angle of about 23.5°. That is, the inclination angle of the collector would decrease from the equinox until the summer soltice was reached by June 21 by an amount of 23.5°, and thereafter the procedure would reverse until the autumn equinox of September 21, or the center point again, and then the tilt angle would be increased until December 22 by an additional 23.5°, at which time it would be reversed again. This angular adjustment is made by turning the extensible turnbuckle rod 26 in one direction or the other, which can be done weekly, since this is well within the tolerances of the collector. This is illustrated in connection with FIG. 3, showing the movable or rotable frame 14 in its farthest tilted position in one direction with the turnbuckle 26 fully extended.

The operation of the gravity flow system is more clearly illustrated in connection with FIG. 2. The collected would normally face skyward due to the weight of the copper coils 50 along with the secondary glass covering 51, which are located below the center of rotation of the collector 17 on the shaft 18. The copper tubing 50 along with a center pipe 52 are located along the focal length of the parabolic collector 17. The collector 17 has attached thereto the five vented fluid containers 35, 37, 40, 39, and 47 that are interconnected with tubing and petcocks for the control of the fluid flow and thereby the movement of the collector. Three of the containers are positioned on the north end, one of which 35 is positioned on the top section, while a second 37 is positioned externally about level with the collector center shaft 17 and the third north end container 40 is external on the lower center member connected to container 37 with a pipe 38 having a petcock 42 therein. In addition, the west side of the collector on the south end has a container 47 at the uppermost portion of the collector and a second container 39 on the west side positioned approximately in the middle of the collector 17. Container member 35 may hold about three gallons of water (approximately twenty-seven pounds) to maintain a due easterly direction of the parabolic collector 17. Petcock 41 in line 36 permits flow from the container 35 to the container 37 at a rate of one-half gallon per hour. This causes a slow counter-clockwise rotation of the trough which maintains by the motion a perpendicular direction to the sun rays. The fluid from cylinder 37 is fed to the container 40 when collector 17 has rotated sufficiently for the fluid therein to reach the opening in pipe 38, and will not take place until the container 37 has received most of the water from container 35. At this time the collector 17 is at about a forty-five degree angle and is rotated sufficiently that all the water will flow from the container 37 to container 40 with the petcock adjustment 42 in the line 38 used to adjust for a uniform flow. The flow is next from the vented container 40 to the container 39 through the line 45 and through an adjustment petcock 46 and from container 39 to container 37 through the line 48 having an adjusting petcock 49, which then completes the movement of the collector to due west. To make the system work automatically, a small float or trip switch can be connected with a small pump so that the fluid can be pumped from the container 47 when the most westerly position is reached to pump the fluid back to the container 35, or alternatively, an automatic timer can be used to pump the fluid from container 47 to 35 and to start the fluid flow for the next day's operation. Each container is connected to the tube for the next container at a point where the flow will not begin until the collector 17 has tilted to a point so that one container substantially fills prior to beginning its discharge.

Figure 5:
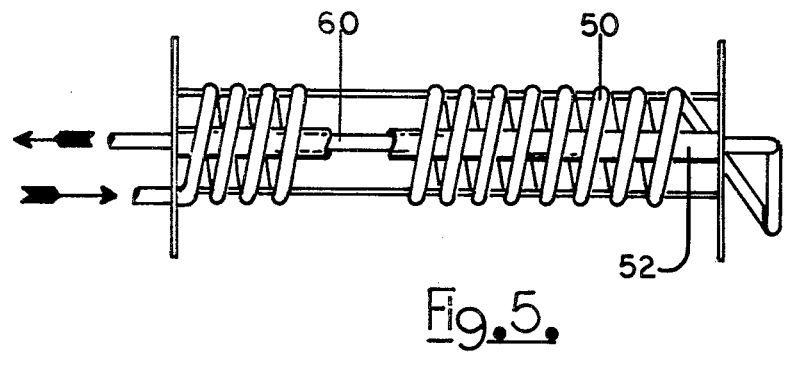
FIG. 5 is a fragmented sectional view of the heating coils of a solar collector, FIGS. 1 through 4.

Turning now to FIGS. 5 and 6, the coils 50 are wrapped in a helical manner, but are not in contact with a highly reflective hollow metal pipe 52, which is fixed along the entire focal length of the parabolic collector 17. Tempered glass 51 having an internal reflective surface is mounted to the collector 17 and covers the coil to produce a greenhouse effect, as does the topmost glass 21. The coiled pipe 50 may be black-coated copper tubing, and a liquid is fed therethrough as illustrated in FIG. 5 with one end connected to tubing 60 extending through the tube 52, so that the water passing through the coil 50 is heated by the concentrated solar energy that is being reflected from the parabolic collector and which are reflected from the center tube 52. In addition, the environment which the copper tube 50 is mounted under the glass 51 in the bottom of the collector 17 produces a high ambient temperature for further heating the liquid passing through the copper tube. The glass 21 also helps insulate and heat the environment between the glass 51 and 21 and prevents trash and dirt from covering the reflective inner surfaces of the collector.

Figure 4:
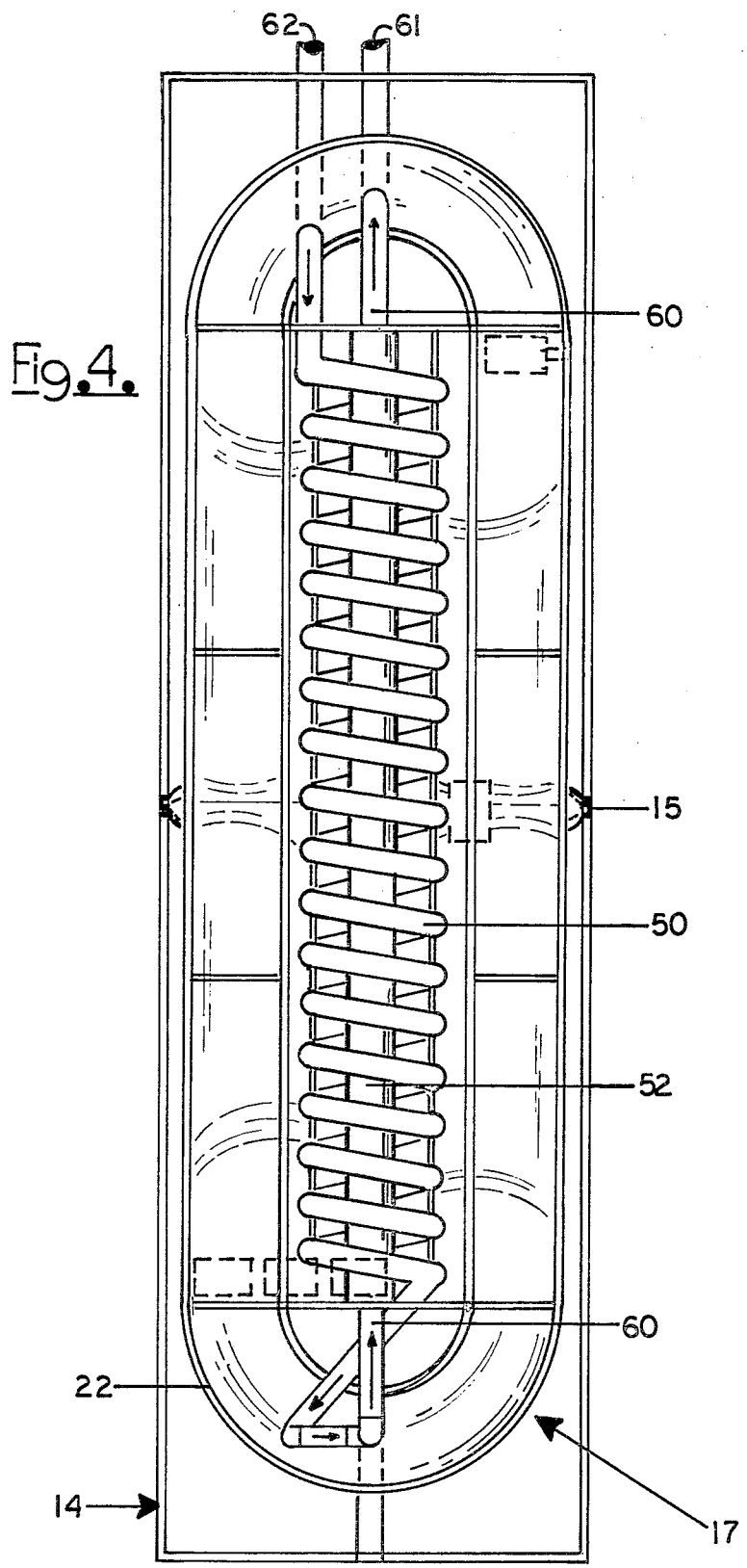
FIG. 4 is a top plan view of the solar heater in accordance with FIGS. 1 through 3.

FIG. 4 is a plan view of the collector showing the coil 50 mounted therein with the flexible input pipe 61 and the flexible output pipe 62 connected to the coils 50 and to the pipe 60, respectively. The arrangement of this coil capitalizes on the reflective energy as well as the accumulated ambient temperature provided by the greenhouse effect of the glass coverings and the curved parabolic ends 24 makes maximum utilization of the solar energy and the control system maintains the collector which is always pointing directly towards the sun for producing a maximum utilization of the energy from the sun rays over the entire face of the collector 17. It should, of course, be clear at this time that other embodiments and variations are contemplated as being within the scope of the invention, and the present preferred embodiment is to be considered illustrative rather than restrictive.

I claim:

1. A solar fluid heater comprising in combination:
   a frame having a base and a movable portion;
   solar collector means for collecting and concentrating solar energy, said solar collector means being movably attached to said frame;
   inclination adjustment means for adjusting said solar collector means for different inclinations of the earth relative to the sun, said inclination adjustment means being attached between said frame base and said movable portion;
   solar tracking means for moving said solar collector means on said frame during daylight hours responsive to the displacement of a liquid from one reservoir mounted on said collector means whereby said solar collector means may be directed to follow the sun; and
   flow control means for controlling the gravity flow of liquid from said one liquid reservoir to adjust the rate of movement of said solar collector means.

2. A solar heater in accordance with claim 1 in which said solar tracking means includes means moving said solar collector means on said frame during daylight hours responsive to the flow of a liquid from one reservoir to a second reservoir.

3. The solar heater in accordance with claim 2, in which said solar tracking means controls the movement of said solar collector means responsive to the flow of a liquid through a plurality of reservoirs.

4. The solar heater in accordance with claim 3, in which said first reservoir is a refillable, vented reservoir.

5. The solar heater in accordance with claim 4, in which said inclination adjustment means includes means connected between said frame base and movable portion for adjusting said movable portion relative to said base.

6. The apparatus in accordance with claim 5, in which said means for adjusting the position of said movable frame portion to said base portion includes a turnbuckle connected to said base frame portion and said rotable frame portion for rotating said movable frame portion.

7. The apparatus in accordance with claim 6, in which said movable frame portion includes at least one arcuate frame member rotably positioned on said base frame for rotation thereon.

8. The apparatus in accordance with claim 7, in which said movable frame portion is connected to said base frame portion by supporting frame arms supporting a pair of support pins.

9. The apparatus in accordance with claim 8, in which said solar collector means includes a parabolic solar collector having curved ends.

10. The solar heater in accordance with claim 9, in which said solar collector means includes coiled tubing mounted in the bottom of said parabolic collector surrounding the focal point of the parabolic collector.

11. The apparatus in accordance with claim 10, in which a reflective center pipe is mounted in the middle of the coiled tubing along the focal point of said solar collector.

12. The apparatus in accordance with claim 11, in which the output from said coil passes through an output pipe passing through said center pipe.

13. The apparatus in accordance with claim 12, in which said solar collector means has a transparent cover thereover.

14. The apparatus in accordance with claim 13, in which a flexible water line is connected to one end of said coil and a flexible output line is connected to said pipe passing through said center pipe so that water may flow through said coils, be heated in said solar collector means and pass out of said solar collector means while said solar collector means is following a path to face the sun.

* * * * *